United States Patent
Haas et al.

(10) Patent No.: US 7,400,785 B2
(45) Date of Patent: Jul. 15, 2008

(54) SYSTEMS AND METHODS FOR ASSOCIATING IMAGES

(75) Inventors: William Robert Haas, Ft. Collins, CO (US); Kirk Steven Tecu, Greeley, CO (US); Dave Boll, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 792 days.

(21) Appl. No.: 10/640,078

(22) Filed: Aug. 13, 2003

(65) Prior Publication Data
US 2005/0036042 A1    Feb. 17, 2005

(51) Int. Cl.
*G06K 7/00* (2006.01)
(52) U.S. Cl. .................. 382/312; 382/315; 382/318
(58) Field of Classification Search .......... 382/305, 382/312, 318; 348/231.3, 207.1, 220.1, 716; 386/120; 707/1, 2, 3, 200, 101; 715/507, 715/520; 704/2, E15.045; 358/403
See application file for complete search history.

(56) References Cited

U.S. PATENT DOCUMENTS

| 5,899,581 A | * | 5/1999 | Kawamura et al. .......... 386/120 |
| 6,055,530 A | * | 4/2000 | Sato ................................ 707/3 |
| 6,286,014 B1 | * | 9/2001 | Fukushima et al. ......... 707/200 |
| 6,526,400 B1 | * | 2/2003 | Takata et al. .................... 707/3 |
| 6,762,791 B1 | * | 7/2004 | Schuetzle ................ 348/231.3 |
| 7,162,412 B2 | * | 1/2007 | Yamada et al. .................. 704/7 |

FOREIGN PATENT DOCUMENTS

| JP | 07-295873 | 11/1995 |
| JP | 2002-374481 | 12/2002 |

* cited by examiner

*Primary Examiner*—Anh Hong Do

(57) ABSTRACT

Disclosed are systems and methods for associating images. In one embodiment, a system and a method pertain to capturing an image of image association data, capturing other images to which the image association data is relevant, and associating the other images such that each of the other images will have a file name that is reflective of the captured image association data.

13 Claims, 10 Drawing Sheets

SYSTEMS AND METHODS FOR ASSOCIATING IMAGES

BACKGROUND

Digital cameras are used to create electronic image files that can be downloaded to computers and, if desired, shared with others by emailing or posting on a web site. When image files are downloaded from the camera to a computer, such as a personal computer (PC), the computer normally assigns default names to the files as they are stored to memory such as "001.jpg," "002.jpg," and so forth.

Given the nondescript nature of the names generated by the computer as image files are downloaded and stored, it can be difficult for the user to later locate a desired image or group of images in that the only information provided in their file names may be a number and, potentially, the date on which the images were downloaded to the computer. Accordingly, other methods must be used to locate the desired image(s), such as manually reviewing each image in thumbnail form. Such a process is highly inefficient.

Some software packages now permit users to designate a prefix that will be applied to all images downloaded to the computer at a given time. For example, after a connection is made between the camera and the computer, the computer may present preview images (e.g., thumbnails) of the various images available for download and may further prompt the user to enter a name to assign to the various images the user selects. When the user enters a name, that name is assigned to each image. Therefore, if the user entered the name "John's Birthday," the downloaded images may have names such as "John's Birthday_001.jpg," "John's Birthday_002.jpg," etc.

Although enabling the user to assign a more descriptive name to the user's stored images, the above-described method has attendant disadvantages. For one, the entered name will be assigned to each downloaded image regardless of whether the name is relevant to each downloaded image. Therefore, if there are 20 image files to download, but only 18 pertain to John's birthday, all of the 20 downloaded image files will include the "John's Birthday" designation. This is unfortunate in that, if the user later wishes to find the two images that did not pertain to John's birthday, that user may actually be misled by those two images' names and therefore may have difficulty in locating the images.

Notably, the misnaming described above can be avoided by carefully choosing which images to download from those available for download from the camera. For instance, if a first group of images pertain to a Christmas celebration and another group of images pertain to a New Year's celebration, the name "Christmas" can be associated with the images of the first group and the name "New Year's" can be associated with the images of the second group by first downloading the images of the first group, and then separately downloading the images of the second group. Unfortunately, however, this process is tedious for the user and, in some cases, may require the user to open, close, and reopen the image downloading program that executes on the computer.

In another solution, the user can simply download all images and later re-organize the images under relevant folders and, if desired, rename each image with a name that pertains to the folder name. Clearly, however, this method is manually-intensive and inefficient.

SUMMARY OF THE DISCLOSURE

Disclosed are systems and methods for associating images. In one embodiment, a system and a method pertain to capturing an image of image association data, capturing other images to which the image association data is relevant, and associating the other images such that each of the other images will have a file name that is reflective of the captured image association data.

BRIEF DESCRIPTION OF THE DRAWINGS

The disclosed systems, apparatus, and methods can be better understood with reference to the following drawings. The components in the drawings are not necessarily to scale.

DETAILED DESCRIPTION

As can be appreciated from the foregoing, it would be desirable to have a system and method with which given images captured with a camera could be easily associated with each other. As is described in the following, such association can be readily achieved by capturing image association data with the camera, and then associating later-captured images with each other. For example, a file name handwritten on an index card or other appropriate medium could be captured using the camera, the captured image analyzed to interpret the name, and that name applied to each of a designated group of images. With such operation, images can be associated with each other as they are captured with the camera so that later effort is not necessary to obtain an appropriate descriptive name for each image.

Disclosed herein are embodiments of systems and methods that may be used to associate images. Although particular embodiments are disclosed, these embodiments are provided for purposes of example only to facilitate description of the disclosed systems, apparatus, and methods. Accordingly, other embodiments are possible.

Figure 1:
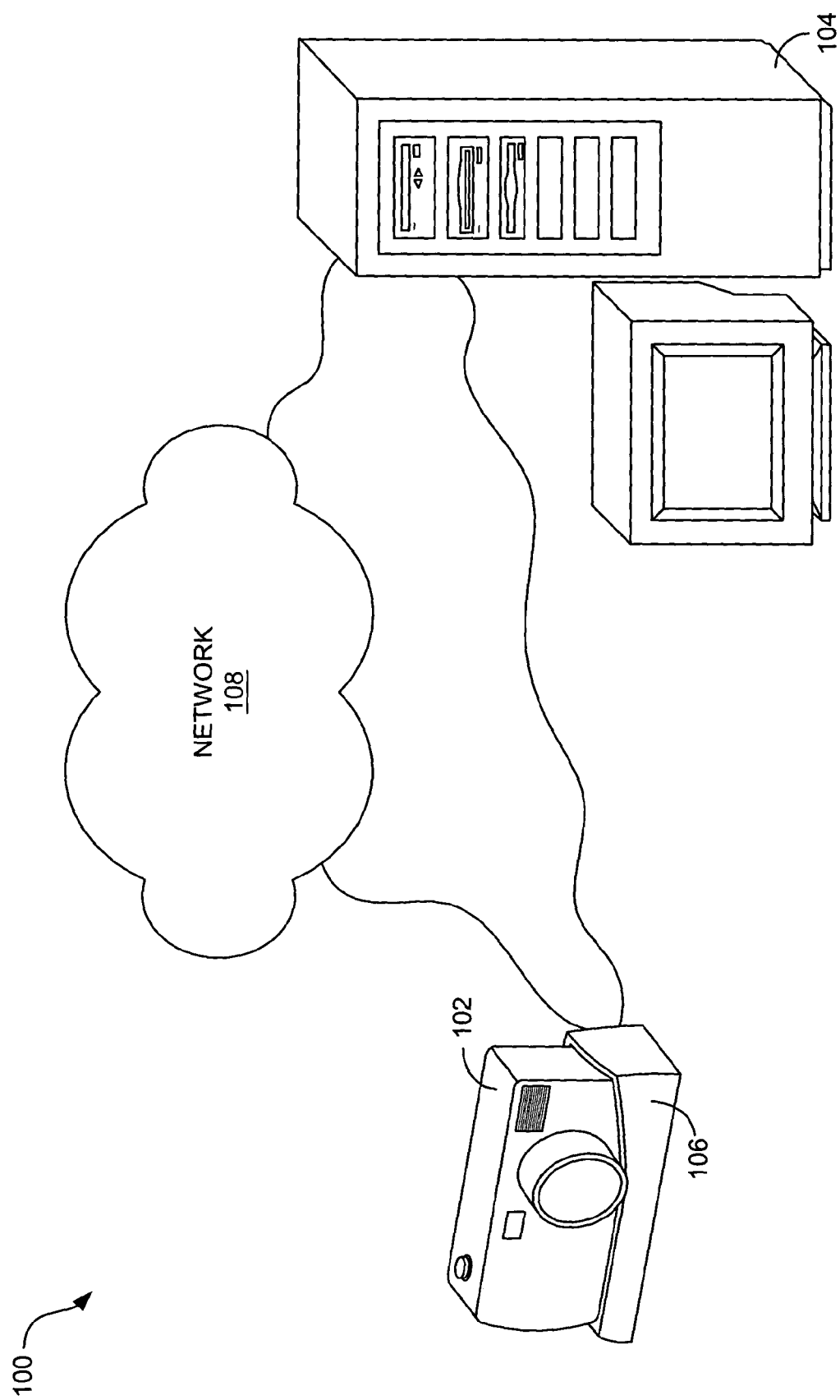
FIG. 1 is a schematic view of an embodiment of a system with which images can be associated with each other.

Referring now to the drawings, in which like numerals indicate corresponding parts throughout the several views, FIG. 1 illustrates a system 100 that enables image association of the manner described above. As indicated in that figure, the example system 100 comprises a camera 102 and a computing device 104 to which the images captured with the camera may be downloaded for viewing and storage. By way of example, the camera 102 comprises a digital camera that, as is described below, is capable of capturing image data with an internal image sensor.

As indicated in FIG. 1, the computing device 104 may comprise a desktop personal computer (PC). Although a PC is shown and has been identified herein, the computing device 104 can comprise substantially any computing device that can communicate with the camera 102 and manipulate image data received therefrom. Accordingly, the computing device 104 could comprise, for example, a MacIntosh™ computer, a notebook computer, a tablet computer, a personal digital assistant (PDA), or the like.

The camera 102 can communicate with the computing device 104 in various ways. For instance, the camera 102 can directly connect to the computing device 104 using a docking station 106 on which the camera may be placed. In such a case, the docking station 106 may comprise a cable (e.g., a universal serial bus (USB) cable) that can be plugged into the computing device 104. Alternatively, the camera 102 can indirectly "connect" to the computing device 104, for instance via a network 108. The camera's connection to such a network 108 may be via a cable (e.g., USB cable) or, in some cases, via wireless communication.

Figure 2:
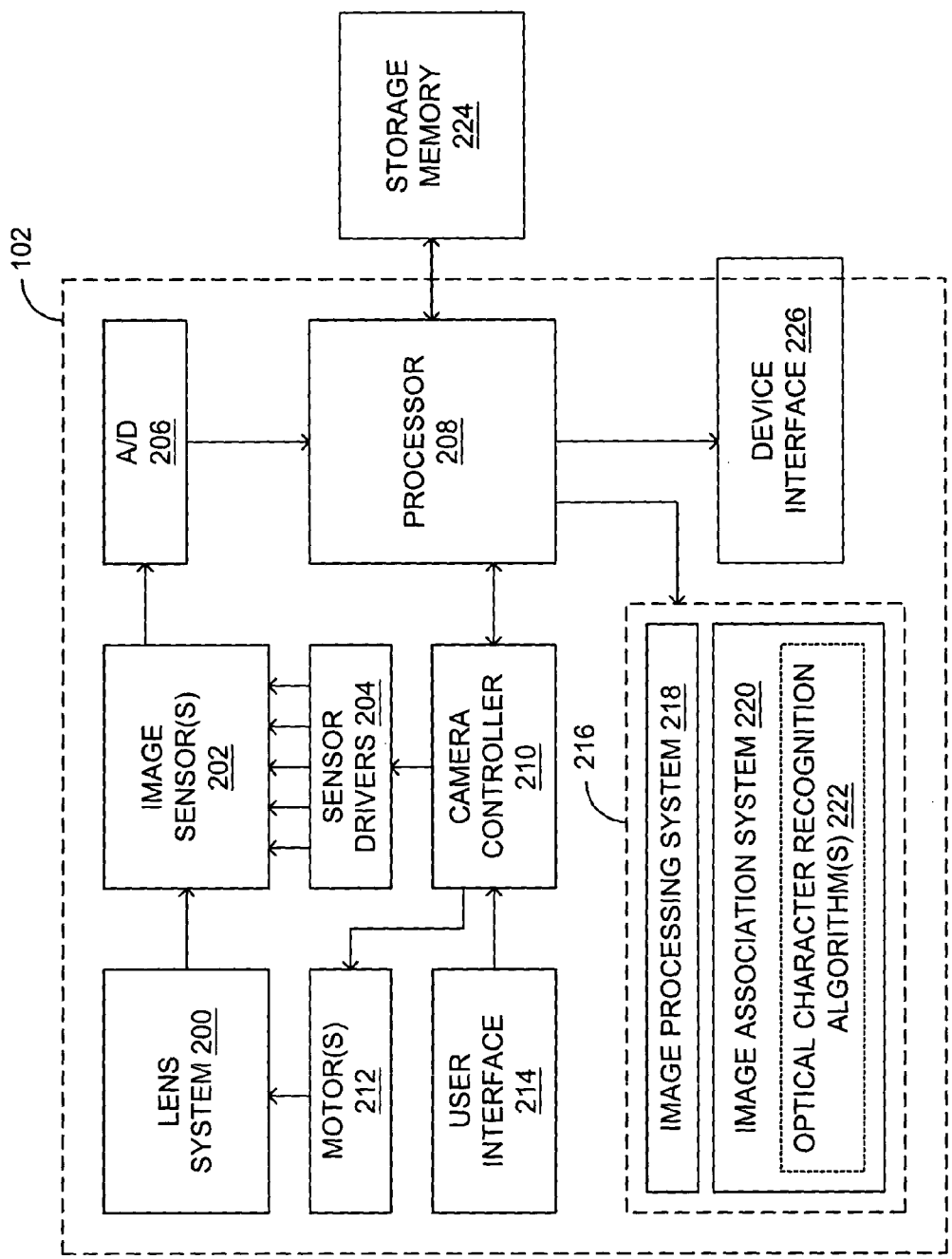
FIG. 2 is a block diagram of an embodiment of a camera shown in FIG. 1.

FIG. 2 illustrates an embodiment of the camera 102 used in the system 100 of FIG. 1. In this embodiment, the camera 102 is a digital still camera. Although a digital still camera implementation is shown in FIG. 2 and described herein, the camera 102 more generally comprises any device that can provide images to the computing device 104 in digital form.

The camera 102 includes a lens system 200 that conveys images of viewed scenes to an image sensor 202. By way of example, the image sensor 202 comprises a charge-coupled device (CCD) or a complementary metal oxide semiconductor (CMOS) sensor that is driven by one or more sensor drivers 204. The analog image signals captured by the sensor 202 are provided to an analog-to-digital (A/D) converter 206 for conversion into binary code that can be processed by a processor 208.

Operation of the sensor driver(s) 204 is controlled through a camera controller 210 that is in bi-directional communication with the processor 208. The controller 210 also controls one or more motors 212 that are used to drive the lens system 200 (e.g., to adjust focus and zoom). Operation of the camera controller 210 may be adjusted through manipulation of the user interface 214. The user interface 214 comprises the various components used to enter selections and commands into the camera 102 and therefore can include various buttons as well as a menu system that, for example, is displayed to the user in a back panel display of the camera (not shown in FIG. 2).

The digital image signals are processed in accordance with instructions from an image processing system 218 stored in permanent (non-volatile) device memory 216. Processed (e.g., compressed) images may then be stored in storage memory 224, such as that contained within a removable solid-state memory card (e.g., Flash memory card). In addition to the image processing system 218, the device memory 216 further comprises a camera-side image association system 220. The image association system 220 is used to associate images with each other as they are captured to either enable descriptive naming of the images within the camera, or to facilitate later descriptive naming of the images on another device, such as the computing device 104. In the former case, the image association system 220 may comprise one or more optical character recognition algorithms 222. Operation of the image association system 220 is described in greater detail in relation to FIGS. 4-8.

The camera embodiment shown in FIG. 2 further includes a device interface 226, such as a universal serial bus (USB) connector, that is used to connect the camera 102 to another device, such as the camera docking station 106 and/or the computing device 104.

Figure 3:
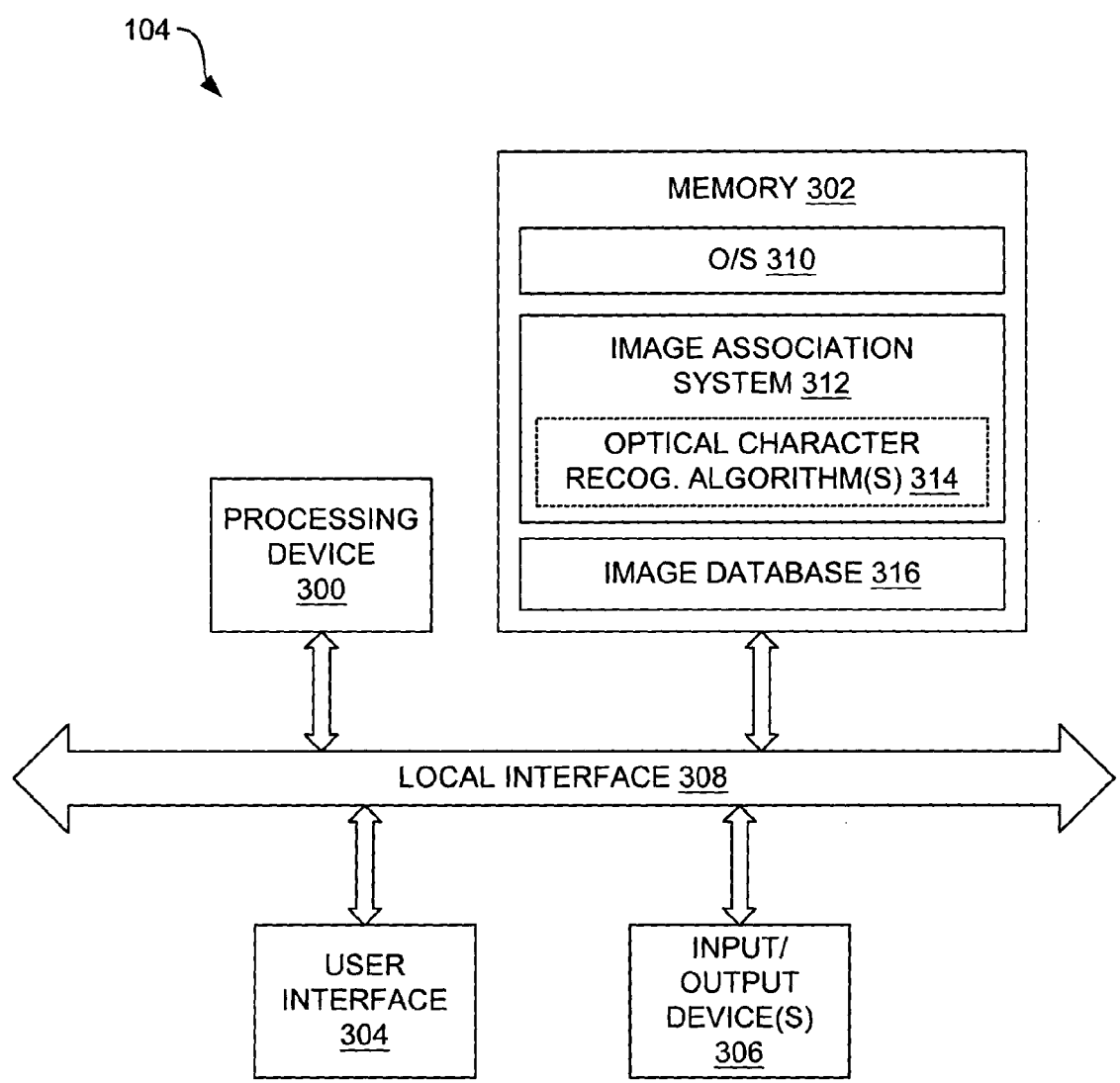
FIG. 3 is a block diagram of an embodiment of a computing device shown in FIG. 1.

FIG. 3 illustrates an embodiment of the computing device 104 shown in FIG. 1. As indicated in FIG. 3, the computing device 104 comprises a processing device 300, memory 302, a user interface 304, and at least one input/output (I/O) device 306, each of which is connected to a local interface 308.

The processing device 300 can include a central processing unit (CPU) or an auxiliary processor among several processors associated with the computing device 104. The memory 302 includes any one of or a combination of volatile memory elements (e.g., RAM) and nonvolatile memory elements (e.g., read only memory (ROM), Flash memory, hard disk, etc.).

The user interface 304 comprises the components with which a user interacts with the computing device 104, such as a keyboard and mouse, and a device that provides visual information to the user, such as a cathode ray tube (CRT) or liquid crystal display (LCD) monitor.

With further reference to FIG. 3, the one or more I/O devices 306 are configured to facilitate communications with the camera 102 as well as the other devices 116 and may include one or more communication components such as a modulator/demodulator (e.g., modem), USB connector, wireless (e.g., (RF)) transceiver, a telephonic interface, or a network card.

The memory 302 comprises various programs, for instance in software, including an operating system 310 and a computer-side image association system 312. The operating system 310 controls the execution of other software and provides scheduling, input-output control, file and data management, memory management, and communication control and related services. As with the camera-side image association system 220, the computer-side image association system 312 associates captured images with each other and, in some cases, may assign descriptive names to the images. In cases in which the camera 102 is not equipped to perform optical character recognition, the image association system 312 may include one or more optical character recognition algorithms 314.

In addition to the above-mentioned components, the memory 302 may comprise an image database 316, for instance located on a hard disk, that is used to store and arrange images captured by the camera 102.

Various programs have been described above. These programs can be stored on any computer-readable medium for use by or in connection with any computer-related system or method. In the context of this disclosure, a computer-readable medium is an electronic, magnetic, optical, or other physical device or means that contains or stores a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 4:
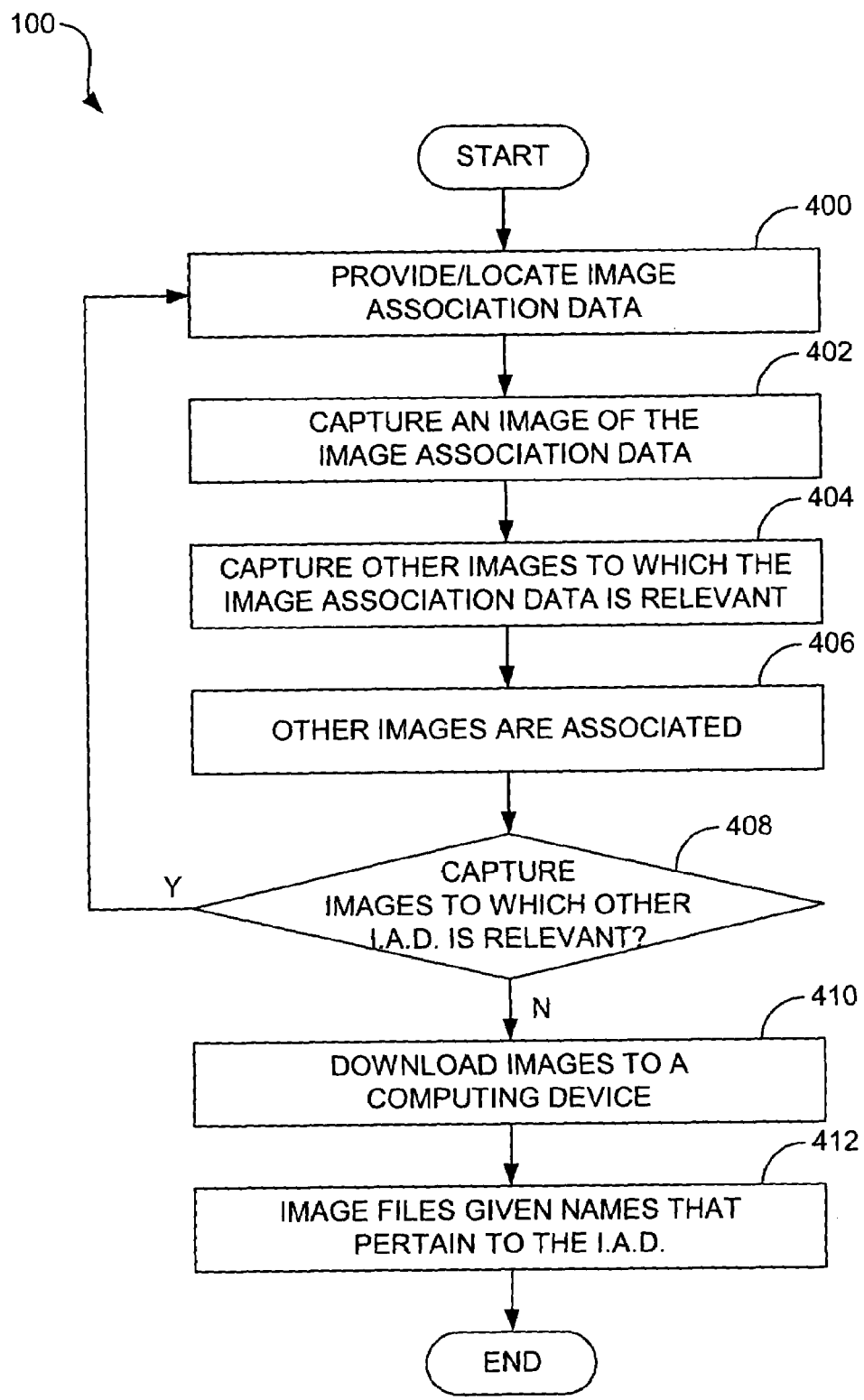
FIG. 4 is a flow diagram that illustrates an embodiment of a method for associating images.

FIG. 4 is a flow diagram that provides an overview of a method for associating images. Process steps or blocks in the flow diagrams of this disclosure may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 5:
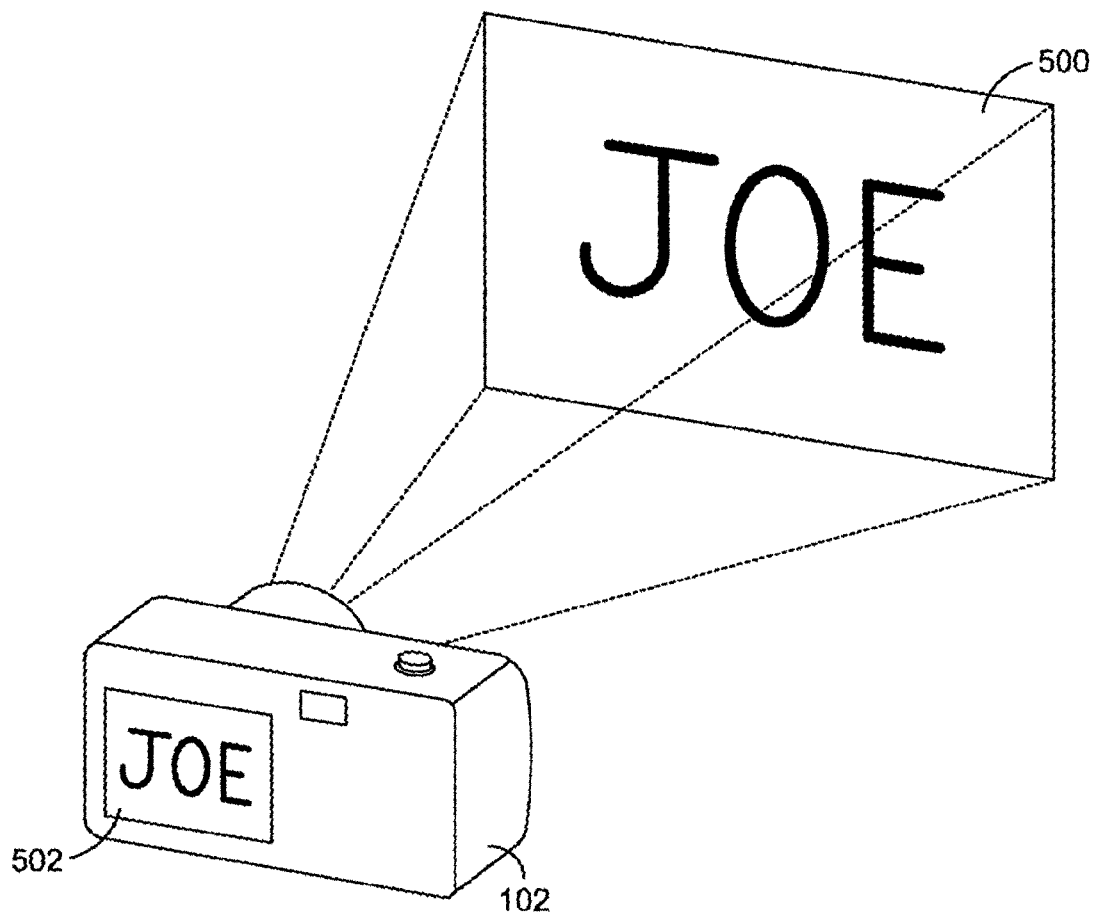
FIG. 5 is a schematic view depicting an example of capturing a selected name in the method of FIGS. 4.

Beginning with block 400 of FIG. 4, the user provides or locates image association data to be used to associate later-captured images. The image association data may comprise one or more written words that comprise a file name that the user would like to apply to one or more images. By way of example, the user can hand-write the one or more words on an index card, or other appropriate writing medium, in clear block letters. Such an example is illustrated in FIG. 5. As shown in that figure, the user has handwritten the name "JOE" on an index card 500. Alternatively, however, the user may simply locate a desired name that has already been written out (e.g., printed). For example, if the user is on vacation at the Grand Canyon and comes across a sign that says "GRAND CANYON" at the edge of the canyon, the sign may be used as a source of the one or more words.

Returning to FIG. 4, the user then captures an image of the image association data (e.g., one or more words), as indicated in block 402. An example of such capture is depicted in FIG. 5, with an image of the image association data (i.e. the word "JOE") being shown in a back panel display 502 of the camera 102. With reference back to FIG. 4, once the image association data has been captured, other images may be captured to which the image association data is relevant, as indicated in block 404. For example, if the user captured an image of the word "JOE," the images that are captured thereafter may be of or may include a person named Joe. In similar manner, if the user captured the words "GRAND CANYON," the images that are captured thereafter may be of the Grand Canyon.

With reference next to block 406, the captured images are associated such that they may be automatically given file names that are reflective of the image association data. Examples of such association are described below with reference to FIGS. 6-8. Flow from this point depends upon whether the user wishes to capture images to which other image association data is relevant, as indicated in decision block 408. For example, if the user has finished taking pictures of Joe and later, for instance several hours or days later, wishes to take pictures of a person named "Susan", the images that will be captured will pertain to other image association data, for instance the word "SUSAN." In such a case, flow returns to block 400, and continues in the manner described above. If, on the other hand, no other images are to be captured, flow continues to block 410 at which the user downloads the images captured with the camera to a computing device, such as a user P.C.

As the images are downloaded to the computing device, the images are given names that pertain to the image association data, as indicated in block 412. For instance, if the user captured the word "JOE" and took several pictures, and later captured the word "SUSAN" and took several more pictures, the images of the first group may have names such as "Joe__001.jpg," "Joe__002.jpg," and so forth, while the images of the second group may have names such as "Susan__001.jpg," "Susan__002.jpg," etc.

Figure 6:
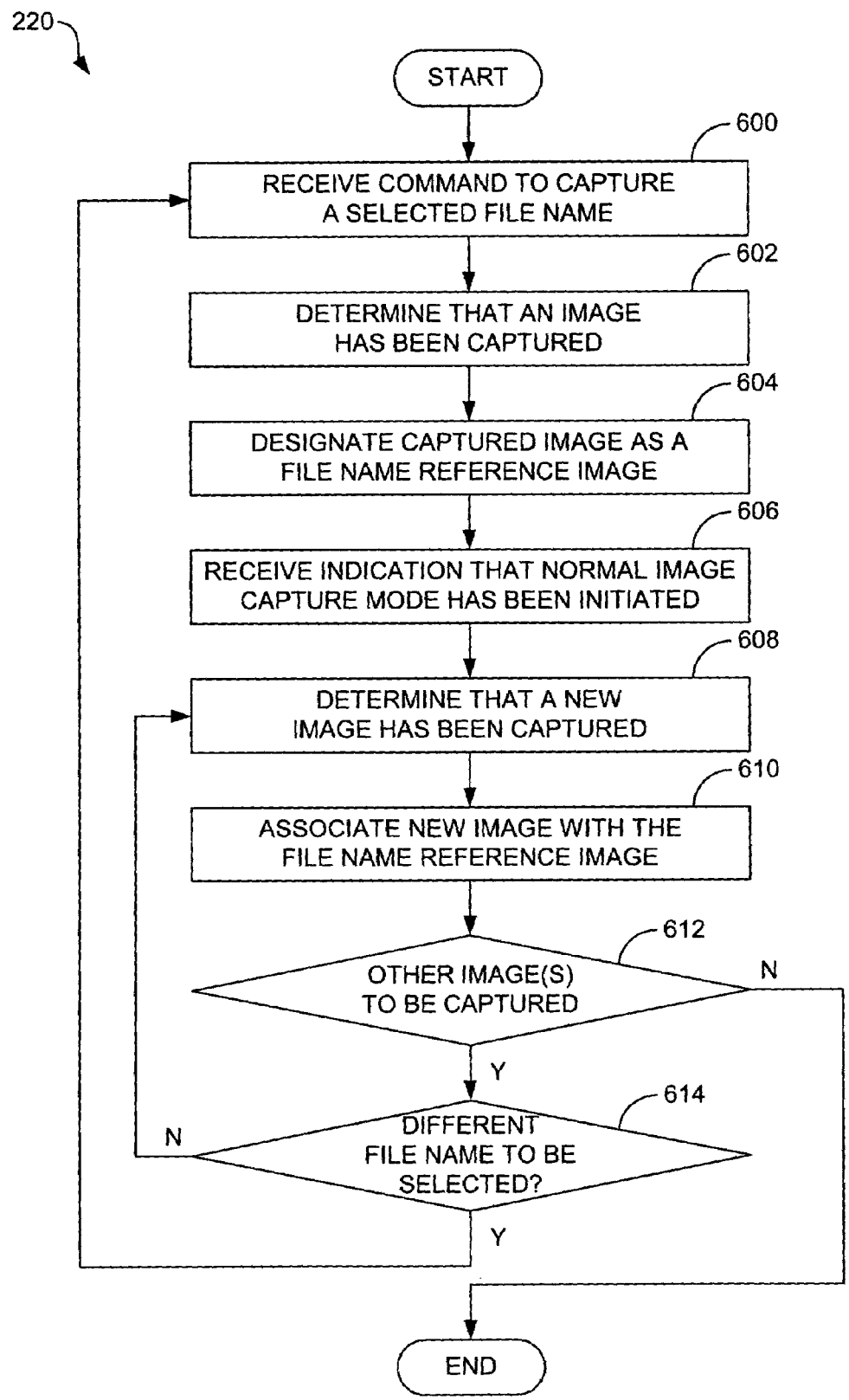
FIG. 6 is a flow diagram that illustrates a first embodiment of operation of an image association system of the camera shown in FIG. 2.

FIG. 6 illustrates an example of a first embodiment of operation of the image association system 220 of the camera 102 in facilitating the sort of image association described above in relation to FIG. 4. In this example embodiment, and others described in the following, the image association data is presumed to comprise one or more words that the user has either generated (e.g., hand-wrote or printed) or located, and which the user wishes to use as a selected file name. Beginning with block 600 of FIG. 6, the image association system 220 receives a command to capture a selected file name. This command can have been entered by the user via the user interface 214 (FIG. 2), for instance by manipulation of one or more buttons and/or a menu system, to signal to the image association system 220 that the selected name is about to be captured and that subsequently captured images are to be associated with the image that contains the selected name.

Next, in block 602, the image association system 220 determines (e.g., detects) that an image has been captured. Specifically, the system 220 determines that an image has been captured by the camera 102 while the camera is in an image association data (e.g., name) capture mode in which the camera was placed because of receipt of the command in block 600. Therefore, the image association system 220 "knows" that the image that was captured is an image with which later-captured images are to be associated. As indicated in block 604, the image association system 220 designates the captured image as a file name reference image, i.e. an image that contains a file name that is to be shared with subsequently-captured images. This designation can be achieved by, for instance, assigning a file name to the image that identifies it to a later device (e.g., computing device 104) as a file name reference image. For example, the file name reference image may be given a name such as "fnri01" to identify it as the first file name reference image. Notably, however, any file name that identifies the image as the file name reference image may be used.

After the file name reference image has been captured, and identified by the image association system 220, the system may receive an indication that a normal image capture mode has been initiated, as indicated in block 606. For example, this mode may be activated when the user communicates to the camera that the user is satisfied with the file name the user has generated/located and captured, and therefore the user is ready to take pictures with the camera. Therefore, the user may take a picture and, with reference to block 608, the image association system 220 will determine (e.g., detect) that a new image has been captured. Once that determination has been made, the image association system 220 associates the new image with the file name reference image, as indicated in block 610. This association may comprise, for instance, assigning a file name to the new image that identifies it as being associated with the file name reference image. By way of example, the name can be "fnri01__001" to indicate that the image is the first image (i.e. "001") that is associated with the first file name reference image (i.e. "fnri01"). In such a case, the new image's file name incorporates the file name of the file name reference image.

With reference next to decision block 612, flow from this point depends upon whether other images are to be captured with the camera 102. If not, flow for the image association session is terminated and, if desired, the user may download the captured images to another device, such as the computing device 104. If further images are to be captured, however, flow continues to decision block 614 at which it is determined whether a different file name is to be captured. Such a new file name may be desired when the subject or content to be captured has changed. For example, if the user had captured the words "JENN'S BIRTHDAY" and took pictures at a birthday celebration for a person named "Jenn," the user may wish to capture new words for pictures that are to be taken on another occasion that occurred thereafter. If a new file name is to be captured, flow returns to block 600 at which the command to capture the new file name is received. If a new file name is not to be captured, however, i.e. the user simply wishes to take more pictures to which the current file name is relevant, flow returns to block 608 at which the image association system 220 again determines that a new image has been captured. Flow then continues from that point in the manner described above with the new image again being associated with the file name reference image. Again, this association may comprise assigning a file name that links the new image to the file name reference image, such as "fnri01_002."

Figure 7:
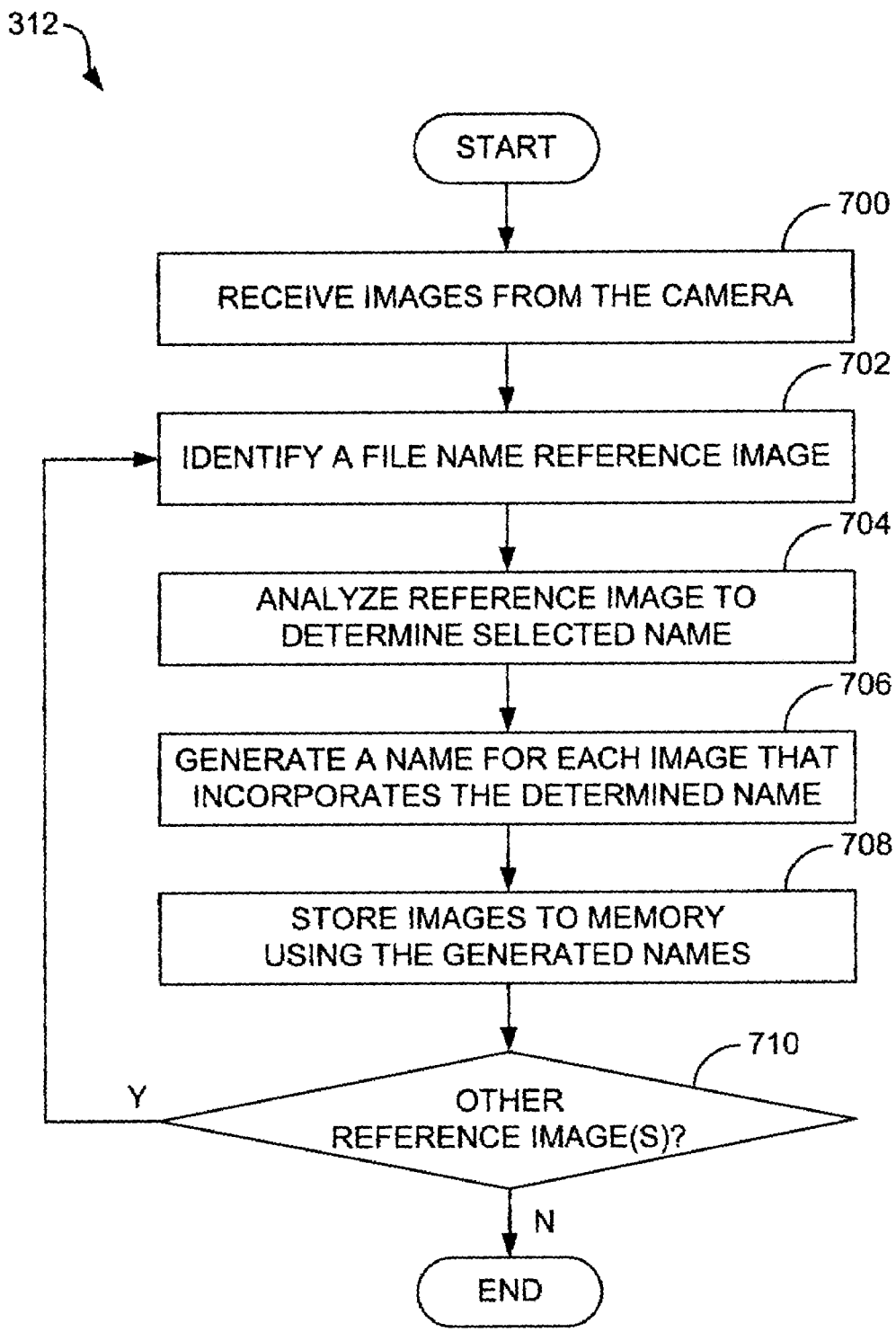
FIG. 7 is a flow diagram that illustrates an embodiment of operation of an image association system of the computing device shown in FIG. 3.

Turning now to FIG. 7, which provides an example of operation of the image association system 312 of the computing device 104, the images captured by the camera 102 in the manner described above in relation to FIG. 6 can be received, as indicated in block 700. Once those images are received, the image association system 312 identifies a file name reference image, as indicated in block 702. That identification is feasible in that, as described above in relation to FIG. 6, the file name reference image was designated as such by the camera-side image association system 220, for instance by assigning a file name that indicates that the file name reference image contains a selected file name. After the file name reference image has been identified, the image association system 312 analyzes the reference image to determine what file name it contains, as indicated in block 704. The analysis may be, for example, performed by an optical character recognition algorithm 314 of the image association system 312. In particular, the optical character recognition algorithm 314 may scan the image data to recognize letters of the word or words of the reference image to determined the selected file name. Optionally, the image association system 312 can at this point present the deciphered name to the user for verification or, if necessary, correction (not shown).

Once the file name has been determined, and verified or corrected if applicable, the image association system 312 generates a name for each image that incorporates the determined file name, as indicated in block 706. For instance, a name may be selected that incorporates the determined file name such as a file name prefix. In such a case, if the file name reference image contained the words "BILL'S GRADUATION," the image files may be given names such as "Bill's Graduation_001.jpg," "Bill's Graduation_002.jpg," etc. At this point, the various images are stored to memory using the generated names, as indicated in block 708. By way of example, the images may be stored to a folder within the image database 316 that has an appropriate name, such as "Bill's Graduation."

With reference next to block 710, flow from this point depends upon whether there are other file name reference images that have been downloaded from the camera 102. This may be the case in situations in which the user captured words for use as file names on more than one occasion, thereby indicating that images captured with the camera pertain to different subjects or content. If other reference images exist, flow returns to block 702 and continues in the manner described above with the associated images are given names that incorporate the relevant selected file name. Otherwise, flow for the image association session is terminated.

Figure 8A:
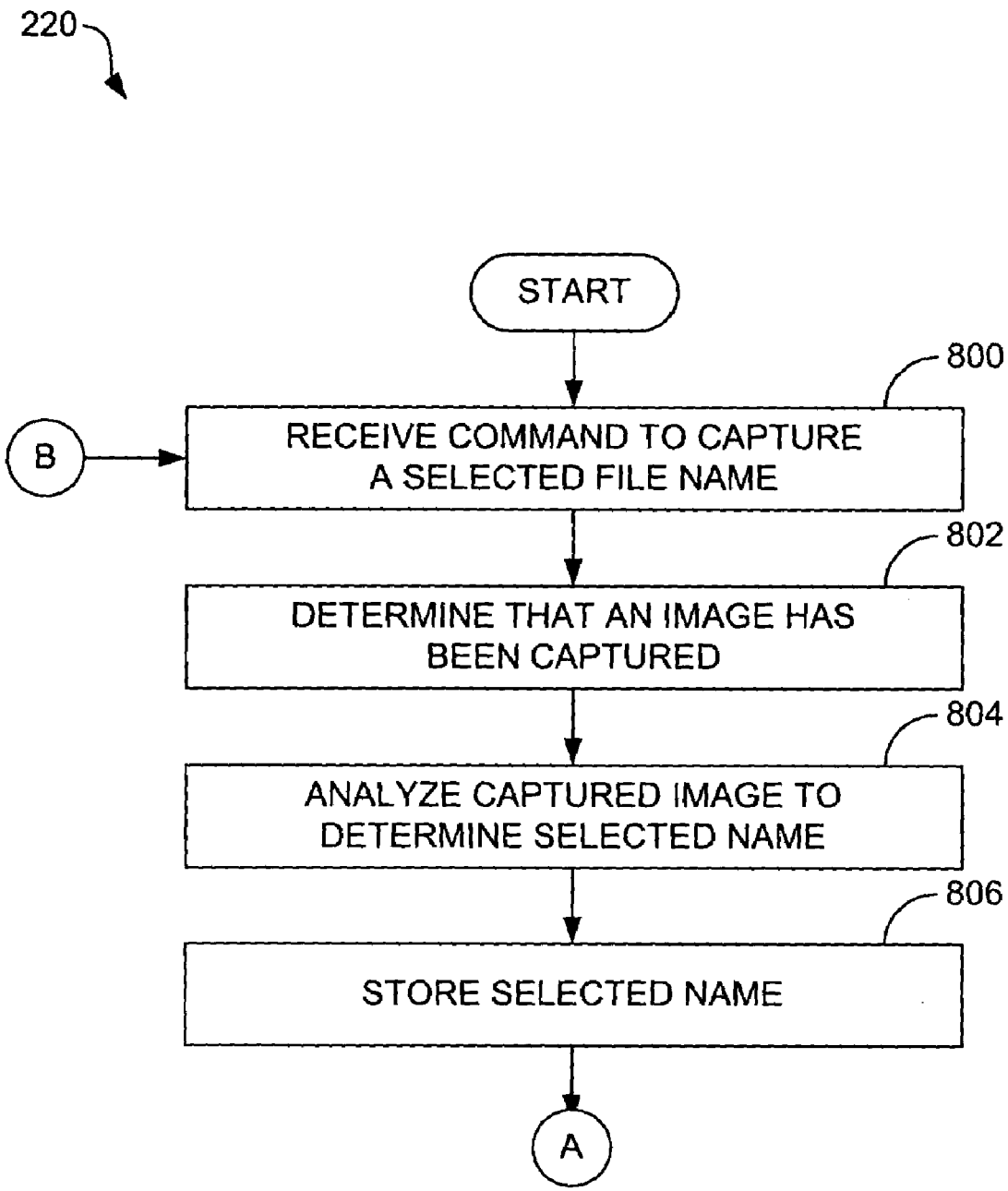
FIGS. 8A and 8B comprise a flow diagram that illustrates a second embodiment of operation of the image association system of the camera shown in FIG. 2.
Figure 8B:
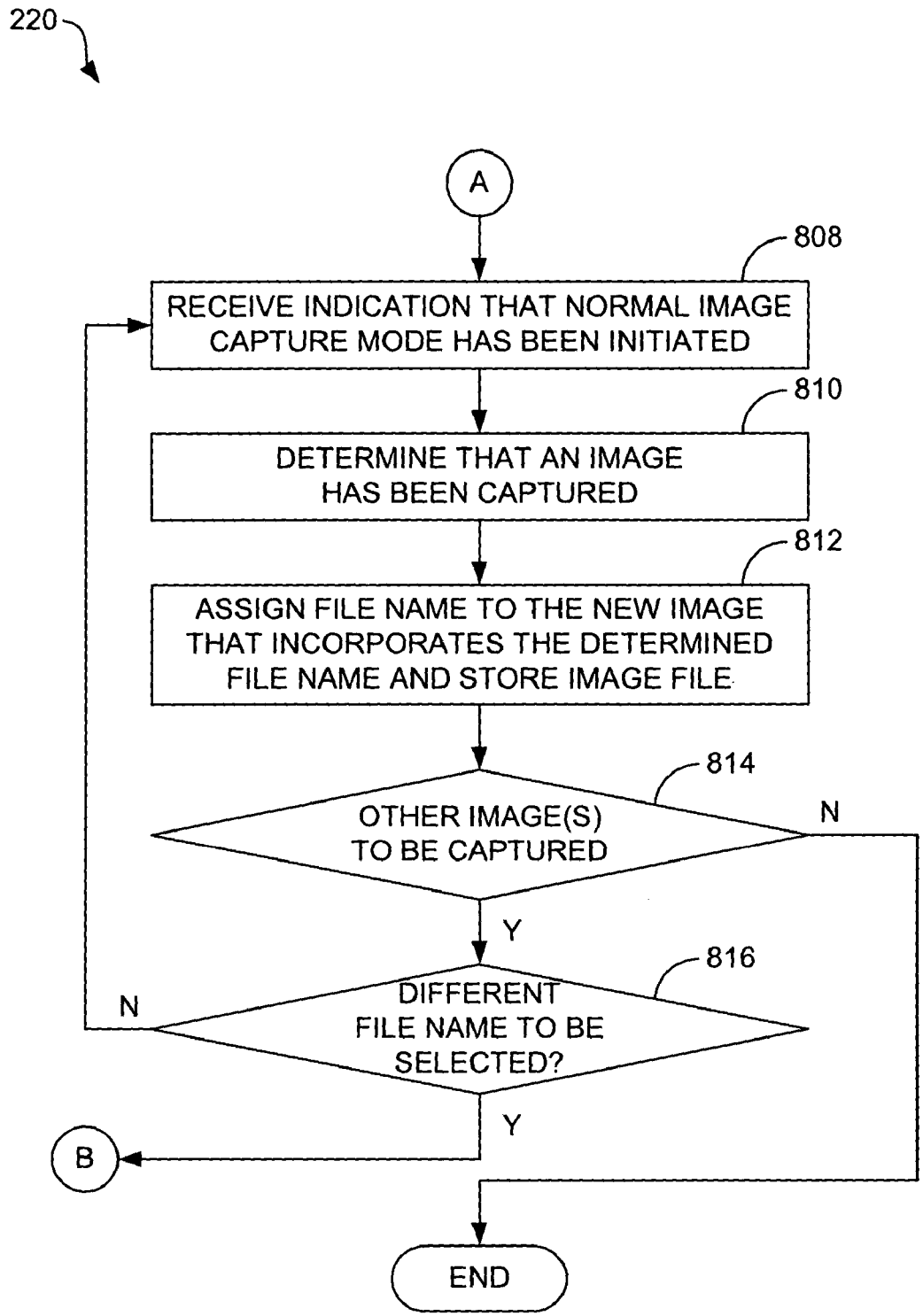

FIGS. 8A and 8B illustrate a second embodiment of operation of the image association system 220. In this embodiment, the image association system 220 is presumed to be capable of recognizing the file name captured for application to subsequently-captured images. Accordingly, the image association system 220 is presumed to comprise one or more optical character recognition algorithms 222 (FIG. 2). Beginning with block 800 of FIG. 8A, the image association system 220 receives a command to capture a selected file name. Again, this command can have been entered by the user via the user interface 214 (FIG. 2), for instance by manipulation of one or more buttons and/or a menu system. Next, the image association system 220 determines that an image has been captured, as indicated in block 802.

In this embodiment, the image association system 220 next analyzes the reference image to determine what selected name it contains, as indicated in block 804. As mentioned above, the analysis may comprise using an optical character recognition algorithm 222 to recognize the letters of the word or words of the reference image to decipher the selected file name. Once this analysis is performed, the image association system 220 can, optionally, present the determined name to the user for verification or, if necessary, correction (not shown).

Once the file name has been determined, and verified or corrected if applicable, the image association system 312 stores the name, as indicated in block 806, such that it can be applied to subsequently-captured images. With reference next to block 808 of FIG. 8B, the image association system 220 receives an indication that a normal image capture mode has been initiated. Therefore, the user may take a picture and, with reference to block 810, the image association system 220 will determine that a new image has been captured. Once that determination has been made, the image association system 220 assigns a file name to the new image that incorporates the determined file name (from block 804) and stores the file, as indicated in block 812. By way of example, if the determined file name is "50TH ANNIVERSARY," the image files may be given names that incorporate the determined file name as a prefix, such as "50th Anniversary_001." Accordingly, the image is initially stored to camera memory using a relevant name so that no further action is required by another device, e.g., the computing device 104, to provide such a name to the file.

With reference next to decision block 814, flow from this point depends upon whether other images are captured with the camera 102. If not, flow for the image association session is terminated and, if desired, the user may download the captured images to another device, such as the computing device 104. If further images are to be captured, however, flow continues to decision block 816 at which it is determined whether a different file name is to be captured. If a new file name is to be captured, flow returns to block 800 of FIG. 8A at which the command to capture the new file name is received. If a new file name is not to be captured, however, i.e. the user simply wishes to take more pictures to which the current file name is relevant, flow returns to block 808 at which the image association system 220 again determines that a new image has been captured. Flow then continues from that point in the manner described above with the new image again being assigned a relevant file name, for instance, "50th Anniversary_002."

Various modifications to the above-described systems and methods can be implemented. For instance, in some embodiments, a split screen view can be displayed when the user reviews captured images that shows the captured image in one portion of the display, and shows an image of its associated file name in the other portion. Such an implementation would facilitate convenient image identification on the camera, particularly in cases in which many (e.g., hundreds) of images are stored on the camera. In another implementation, image association can be disabled on the camera by the user if, for example, the images that are to be captured do not pertain to any particular subject or if the user simply does not want the images to be automatically given descriptive names.

Figure 9:
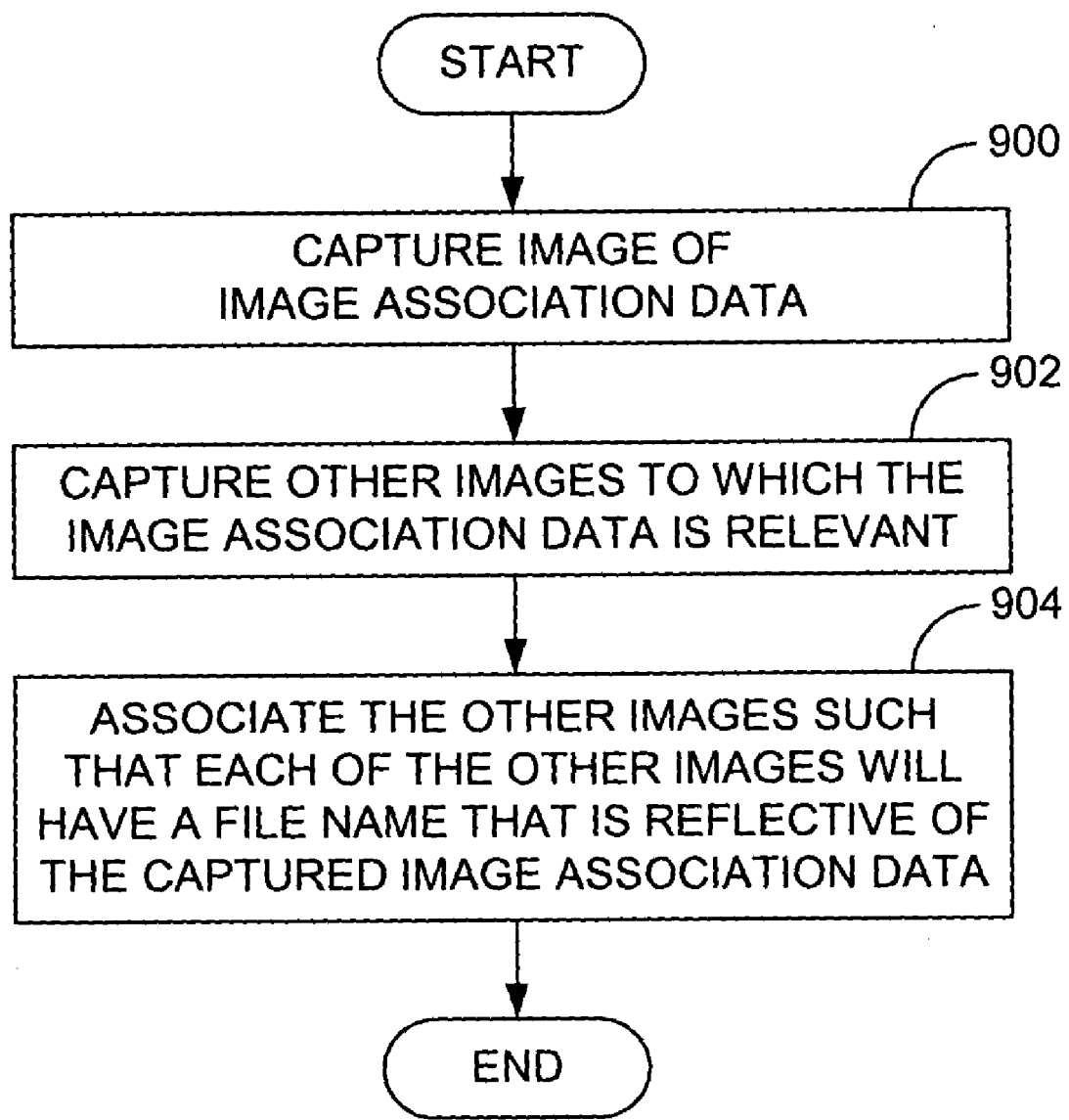
FIG. 9 is a flow diagram that summarizes a method for associating images.

In view of the above disclosure, a method for associating images may be summarized as provided in FIG. 9. As indicated in that figure, an image of image association data is captured (block 900), other images are then captured to which the image association data is relevant (block 902), and the other images are associated such that each of the other images will have a file name that is reflective of the captured image association data (block 904).

What is claimed is:

1. A method for associating images, the method comprising:
   capturing with a camera a reference image of at least one written word that is to be used as part of a file name for a subsequently-captured image;
   capturing with the camera a subsequent image to which the at least one written word is relevant; and
   automatically incorporating the at least one written word into a file name under which the subsequent image is stored.

2. The method of claim 1, wherein capturing an image of at least one written word comprises capturing an image of a file name that has been handwritten by the user on a writing medium.

3. The method of claim 1, further comprising analyzing the reference image to identify the at least one written word.

4. The method of claim 3, wherein analyzing the reference image comprises the camera analyzing the reference image to identify the at least one written word.

5. The method of claim 3, wherein analyzing the reference image comprises a computer that receives the captured images from the camera analyzing the reference image to identify the at least one written word.

6. The method of claim 1, wherein incorporating the at least one written word into a file name comprises assigning a file name to the subsequent image that uses the at least one written word as a file name prefix.

7. A digital camera that stores:
   logic configured to capture a reference image of at least one written word, wherein the at least one word is to be used as part of a file name for a subsequently-captured image;
   logic configured to designate the reference image on the camera as a reference image so that a computer can later identify the reference image;
   logic configured to determine on the camera when a subsequent image has been captured by the camera; and
   logic configured to associate the subsequent image with the reference image on the camera so that the computer can later identify the subsequent image as being associated with the reference image.

8. A computer-readable medium that stores:
   logic configured to capture with a digital camera a reference image of at least one written word, wherein the at least one word is to be used as part of a file name for a subsequently-captured image;
   logic configured to analyze the reference image on the camera to identify the at least one written word the reference image contains; and
   logic configured to generate with the camera a file name for a subsequently-captured image, wherein the file name incorporates the at least one written word.

9. The computer-readable medium of claim 8, wherein the logic configured to analyze comprises an optical character recognition algorithm that executes on the camera.

10. The computer-readable medium of claim 8, wherein the logic configured to generate a file name comprises logic configured to generate a file name that incorporates the at least one written word as a file name prefix.

11. A computer-readable medium that stores:
    logic configured to receive on a computer a reference image and at least one other image from a digital camera, the at least one other image being associated with reference image;
    logic configured to analyze on the computer the reference image to identify at least one written word that comprises part of the image content of the reference image; and
    logic configured to assign on the computer a file name to the at least one other image that incorporates the at least one written word.

12. The computer-readable medium of claim 11, wherein the logic configured to analyze comprises an optical character recognition algorithm.

13. The computer-readable medium of claim 11, wherein the logic configured to assign a file name comprises logic configured to assign a file name that incorporate the at least one written word as a file name prefix.

* * * * *